Oct. 1, 1940.   T. R. HARRISON   2,216,472
MEASURING AND CONTROL APPARATUS
Filed Feb. 4, 1938

INVENTOR.
THOMAS R. HARRISON
BY George M. ...
ATTORNEY.

Patented Oct. 1, 1940

2,216,472

UNITED STATES PATENT OFFICE 2,216,472

MEASURING AND CONTROL APPARATUS

Thomas R. Harrison, Wyncote, Pa., assignor to The Brown Instrument Company, Philadelphia, Pa., a corporation of Pennsylvania Application February 4, 1938, Serial No. 188,732

3 Claims. (Cl. 250—41.5)

The present invention relates to instrumentalities useful in measuring and/or controlling a variable condition, and more particularly to electronic measuring and/or control apparatus adapted to produce effects in accordance with the deflection of an element which controls the apparatus and deflects in accordance with variations in a control quantity or in a quantity to be measured, and in which because of the small magnitude of the element deflecting force it is not desirable, nor possible, to have the said effects directly produced by the deflecting element.

An object of the invention is to provide a measuring instrument in which an element deflecting in accordance with changes in the value of a quantity to be measured is included in an instrument comprising a single light sensitive cell and an electronic relay mechanism which is adapted to adjust the recording pen, indicating pointer or other exhibiting part of the instrument in accordance with the deflections of the deflecting element.

Another object of the invention is to provide a measuring and/or controlling instrument which is quick in its action and does not overrun or hunt and is adapted to produce the desired recording and/or controlling effects in response to small deflections of the most sensitive measuring instruments.

According to one form of my present invention, an element deflecting in accordance with variations in a condition under measurement is employed to control the illumination of a single light sensitive device and the latter, in turn, is adapted to selectively control the rotation and direction of rotation of a reversible electrical motor in accordance with the extent to which it is illuminated. In order that the motor energization may be suitably sharp, I provide a triggering mechanism comprising a source of radiant energy, a suitably formed shield, and a light sensitive device so arranged that when the deflecting element is in its normal undeflected position the light sensitive device will be illuminated to a predetermined degree and upon slight deflection of the deflecting element in one direction or the other from its normal position, the illumination of the light sensitive cell will be either cut off altogether or materially increased. As will be apparent, by controlling the illumination of the light sensitive device in this manner, the reversible motor will be sharply controlled for rotation in one direction or the other, and may be employed to quickly effect a follow-up or rebalancing operation for restoring the illumination of the light sensitive device to its normal predetermined value.

Further, in accordance with another form of my invention, the energization of the motor is so controlled that its speed will be proportional, or substantially so, to the extent to which the deflecting element is deflected from its normal position. Thus, the speed of the motor may be great when the deflection of the deflecting element is great, and as the deflection of the deflecting element decreases, the speed of the motor will be correspondingly decreased whereby it will come to rest at the exact point where the illumination of the light sensitive device is the desired and predetermined value. According to this form of my invention, the energization of the motor is interrupted by means responsive to the motor rotation, and the rate of interruption is inversely proportional to the deflection of the deflecting element from its normal position so that the speed of the motor may be great when the element deflection is great and is correspondingly reduced when the element deflection is reduced.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Figure 1:
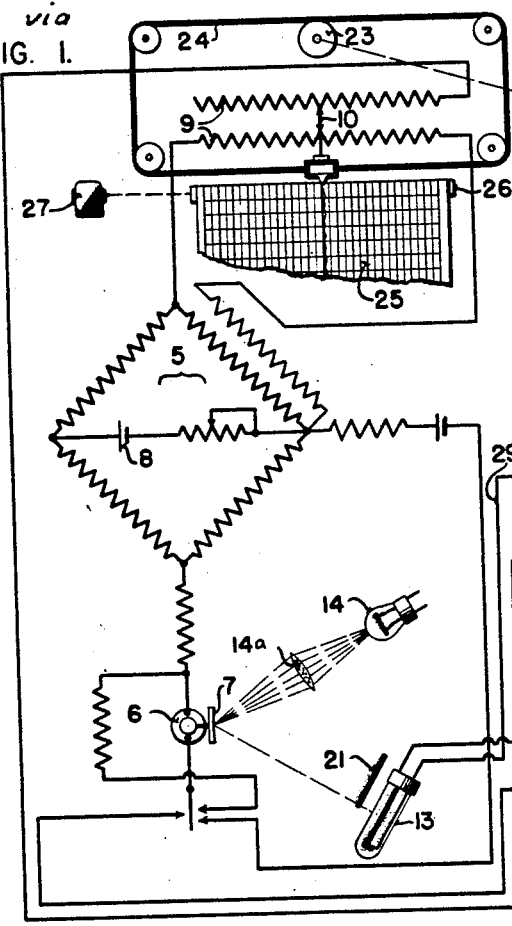
Fig. 1 is a diagrammatic view illustrating one embodiment of the invention as adapted for use in measuring and recording the temperature in a furnace.

In Fig. 1 of the drawing I have illustrated, more or less diagrammatically, a pyrometer for measuring and recording the temperature of the interior of a furnace 1. As illustrated, a thermocouple 2 is arranged in the interior of the furnace and the terminals of the thermocouple are connected by conductors 3 and 4 to the terminals of a null point potentiometric network 5 which may be of any suitable type such as the Brown potentiometric circuit disclosed in my prior Patent 1,898,124, issued February 21, 1933. The moving coil of a galvanometer 6, which is of the reflecting type and equipped with a mirror 7, is connected in the conductor 3. The turning of the galvanometer moving coil is desirably restricted by mechanical stops (not shown).

The potentiometric circuit 5 is of a well-known type, and it is sufficient for the present purposes to note that the potentiometric circuit includes a circuit branch including the thermocouple 2, an opposing circuit branch including a source of known potential such as a battery 8, and resistors 9, a variable portion of which may be connected into the opposed branches by means of a sliding contact 10 whereby the respective effects of the variable and known sources are made equal and opposite, and the galvanometer moving coil is thus rendered undeflected when the circuit is balanced for a given value of the E. M. F. of the thermocouple 2 with the contact 10 in a corresponding position along resistors 9. The position of the contact 10 is then a measure of the value of the thermocouple E. M. F. and, as will be clear, may serve as a measure of the temperature to which the thermocouple is exposed.

In the embodiment illustrated in Fig. 1, my invention is specifically concerned with the means by which the contact 10 is adjusted back and forth along resistors 9 in response to galvanometer deflection, and, as shown, includes an electronic amplifier 11 and a reversible electrical motor 12, the rotation and direction of rotation of which is adapted to be selectively controlled by amplifier 11. Motor 12 is connected in any convenient manner to contact 10 for adjusting the latter along resistors 9, and thereby effects rebalance of the potentiometric network 5 in response to a change in the E. M. F. of the thermocouple 2.

A photoelectric cell 13, which is preferably mounted in a casing (not shown) so as to be shielded from all external light except that emanating from a lamp 14 and directed thereon by the galvanometer mirror 7, is connected to the input terminals of amplifier 11 and is adapted to control the flow of energizing current to a relay 15 connected in the output circuit of the amplifier. An armature 16 in inductive relation to relay coil 15 and pivoted for rotation at 17 is biased by means of a spring 18 away from the relay and into engagement with a fixed contact 19, and is moved against the opposing action of the spring 18 into engagement with a contact 20 when the relay attracting force exceeds that of the spring bias. Normally the flow of energizing current to the relay is such that the attractive force exerted on the armature thereby is just equal to that of the spring bias whereby the armature assumes a position intermediate the contacts 19 and 20 and out of engagement with both contacts.

Contacts 19 and 20 are connected to respective terminals of opposed field windings 12F and 12R of motor 12, the other terminals of which are connected together and by a conductor 12a to one conductor L¹ of an electric current supply source. The other conductor L² of the electric current supply source is connected by a conductor 12b to the armature 16 so that on engagement of the latter with either contact 19 or 20, the motor 12 will be energized for rotation in a forward or reverse direction respectively.

Lamp 14 which may be an electric lamp or equivalent is disposed a predetermined distance from the galvanometer mirror 7, and interposed therebetween is a lens 14a for converging the light rays from lamp 14 upon mirror 7.

According to my invention, the flow of energizing current to relay 15 is adapted to be varied in accordance with the illumination of photoelectric cell 13, and the illumination of the latter, in turn, is adapted to be controlled by galvanometer 6 so that depending upon the direction of deflection of the galvanometer from its neutral position, the attractive force of relay 15 on armature 16 will be larger or smaller than that of the spring 18 and accordingly the motor 12 will be energized for rotation in one direction or the other.

Figure 2:
Fig. 2 illustrates in detail the construction of the shield and its arrangement with respect to the light sensitive device in the apparatus of Fig. 1.

The manner in which the deflection of galvanometer 6 from its neutral position operates to change the illumination of photoelectric cell 13 is best described by considering Fig. 2 in connection with Fig. 1. As illustrated, a shield 21, the outline of which is best seen in Fig. 2, is arranged between the galvanometer mirror 7 and photoelectric cell 13 and adjacent the latter. As seen in Fig. 2, shield 21 is in the form of a rectangular plate having the top of the right hand end cut away a small amount across half of its width leaving a rectangular projecting portion 22 across the bottom whereby the top half of a vertical section of the photoelectric cell 13 is exposed through the opening of the cut away section and the lower half of that vertical section of the photoelectric cell is shielded by the projection 22.

The photoelectric cell 13 and shield 21 are so arranged with respect to galvanometer mirror 7 and lamp 14 that when the galvanometer is in its undeflected position, part of the light reflected toward the cell 13 by mirror 7 is intercepted by the projection 22 on shield 21 and the remainder of the light impinges on the cell. This is the normal equilibrium condition of the system and the energizing current then supplied the relay 15 is the proper value to hold the relay armature 16 in a position intermediate the contacts 19 and 20 whereby motor 12 is not energized for rotation in either direction and remains stationary.

It will be noted, however, that slight deflection of galvanometer 6 in one direction will cause the light impinged on photoelectric cell 13 to be entirely cut off and slight deflection of galvanometer 6 in the opposite direction will cause the light impinging on cell 13 to be materially increased. As a result, in the first mentioned case, the current supplied relay 15 will be materially reduced and consequent engagement of armature 16 with contact 19 will energize motor 12 for rotation in one direction, and in the second mentioned case, the current supplied relay 15 will be materially increased and consequent engagement of armature 16 with contact 20 will energize motor 12 for rotation in the opposite direction.

As illustrated, the shaft of motor 12 is connected through suitable gearing (not shown) to a pulley 23 which carries a cord or other flexible element 24. Cord 24, in turn, carries the potentiometer contact 10 so that when the motor 12 is energized for rotation as a result of deflection of galvanometer 6, the motor effects an adjusting movement of the contact 10 along the slidewire resistors 9 in the proper direction until the potentiometer voltage exactly balances the voltage of thermocouple 2. The unbalance current flow through galvanometer 6 will then be reduced to zero and the latter will return to its normal, undeflected position whereupon the motor will come to rest with contact 10 at a new position along resistors 9, which position will then be a measure of the temperature of the interior of furnace 1.

Desirably, a pen mounted on the carriage which carries the potentiometer contact 10 is arranged to cooperate with a recorder chart 25 and to thereby provide a continuous record of the temperature of the interior of furnace 1. The recorder chart is adapted to be driven by a continuously rotating roller 26, and the latter is driven in any convenient manner, as for example, by a unidirectional motor 27 through suitable gearing (not shown), so that a record of the temperature of the interior of the furnace will be had as a continuous line on the chart.

The arrangement illustrated for controlling the flow of current in the output circuit of amplifier 11 includes conductors 28 and 29 which connect the anode and photocathode, respectively, of cell 13 to the input terminals of an electronic valve 30. Valve 30 is a filament type triode and includes an anode 31, a control grid 32, and a filament cathode 33. Control grid 32 is connected by a resistor 34 and a battery 34a to the cathode 33, the polarity of the battery being such as to bias the control grid negatively with respect to the cathode. Anode voltage is supplied valve 30 from a battery 35 which is shown connected between the anode and cathode in series with the energizing winding of relay 15, and energizing current is supplied the filament cathode 33 by a battery 36 through an adjustable rheostat 37.

Energizing voltage is supplied photoelectric cell 13 by a battery 34b through a series circuit including the resistor 34 and the conductors 28 and 29, and as will be noted, the flow of current through the cell 13 and resistor 34 is in a direction such as to produce a potential drop across the latter which is in opposition to the negative potential impressed on the control grid by the battery 34a. Thus, when the illumination of cell 13 is increased, for example, the conductivity of the cell will increase a proportionate amount and the potential of the control grid will become less negative with respect to the cathode potential and may even become positive with respect thereto to thereby increase the conductivity of the valve a corresponding amount.

As will be apparent, when the potentiometric network is rebalanced at a fast rate of speed the galvanometer position will lag behind the position of the contact 10 so that the position of the galvanometer will not indicate the balanced condition until after contact 10 has moved past the proper position of balance. As a result when the galvanometer finally gets to its normal, undeflected position the potentiometric unbalance will be reversed and a hunting or oscillating action will be set up.

In order that the speed of motor 12 may be as great as possible during rebalancing without overshooting of the balance point and consequent hunting taking place, I have provided means to ensure that the motor speed and the rate of change of its speed is substantially proportional to the extent of potentiometric unbalance. Such means are desirable unless the motor has a suitable damping characteristic of its own and may be embodied in the device shown in Figs. 3 and 4.

Figure 3:
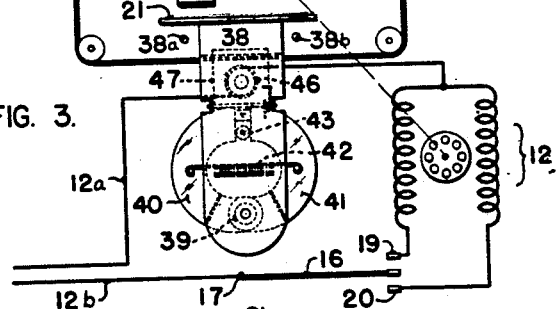
Figs. 3 and 4 illustrate a damping device which may be employed with the apparatus of Fig. 1.
Figure 4:
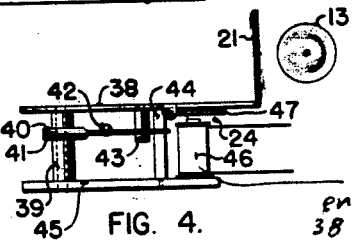

As illustrated in Figs. 3 and 4, shield 21 is fixedly mounted on the end of an arm 38 which is pivoted for rotation on a post 39 and is held in a position such that shield 21 is in the desired relation to photoelectric cell 13 by a pair of circular arms 40 and 41 pivoted on post 39 and biased by means of a spring 42 into engagement with a post 44 and the opposite sides of a projection 43 carried by arm 38 on its under side. Posts 39 and 44 are mounted in an upright position on a bracket 45.

A relay 46 having its terminals connected in circuit with conductor 12a is mounted on bracket 45 along the side of post 44 which is remote from post 39, and is arranged in inductive relation with an armature 47 which is pivoted for rotation on the underside of arm 38 as shown. Armature 47 is arranged in positional relation with cord 24 which is driven by pulley 23 and motor 12 and is normally biased by spring or other means (not shown) out of engagement therewith, but is adapted, when relay 46 is energized, to engage that cord. Since motor 12 is energized for rotation in one direction or the other each time relay 46 is energized, it will be noted that such engagement of armature 47 with cord 24 will tend to produce deflection of arm 38 in a corresponding direction from its normal position against the opposing action of spring 42 because of the transverse movement of cord 24 produced by rotation of motor 12. Desirably, stops 38a and 38b on opposite sides of arm 38 are provided for limiting the extent to which arm 38 is permitted to deflect.

By properly relating the direction of movement of cord 24 and the direction of deflection from its normal position of the light beam reflected by galvanometer mirror 7 towards photoelectric cell 13, it will be apparent that when motor 12 is energized due to galvanometer mirror deflection, the shield 21 will be moved in the same direction that the light beam was deflected to thereby restore the normal relationship between cell 13, shield 21 and the light beam, and to nullify the effect of such mirror deflection. The normal photoelectric cell illumination having thus been restored, the relay armature 16 will assume its normal position intermediate contacts 19 and 20, and motor 12 will be deenergized.

Relay 46 will be deenergized simultaneously, however, and as a result spring 42 will return arm 38 to its normal position whereby the deflection of mirror 7 from its normal position will again be effective to change the illumination of photoelectric cell 13 and cause rotation of motor 12. Deflection of arm 38 will again result and cause the energizing circuit to motor 12 to be interrupted whereby arm 38 will again return to its normal position. This action continues until the potentiometric network 5 is rebalanced and mirror 7 has assumed its normal position.

By so interrupting the energizing current to motor 12, it will be apparent that the latter will not be permitted to coast beyond the position wherein the potentiometric network is balanced, but will come to rest precisely at that position. It will be noted that if the potentiometric network is appreciably unbalanced, mirror 7 will be deflected to a relatively great extent, and the interruptions of the motor circuit will not occur so often because of the greater deflection of arm 38 required. Moreover, by properly adjusting the various instrument parts, it will be apparent that such interruptions need not occur at all when the deflection of mirror 7 is great thereby permitting motor 12 to run at full speed in rebalancing the potentiometric network. As the potentiometric balance point is approached, however, the interruptions of the motor energizing circuit will become more numerous whereby the motor speed will be reduced and the latter will come to rest with potentiometer contact 10 at the exact balance point along resistors 9.

Thus, on an appreciable change in temperature in furnace 1, motor 12 will be continuously energized and effect rapid adjustment of contact 10 along resistors 9 until the thermocouple E. M. F. is almost balanced, and as the balanced position is approached, the energization of motor 12 will be interrupted to cause a reduction in motor speed and stopping of the motor at the exact balance point.

Figure 5:
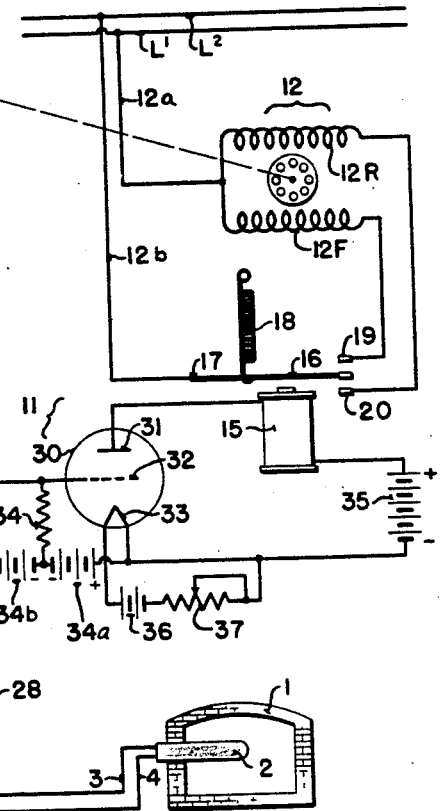
Fig. 5 is a diagrammatic view illustrating the use of the apparatus in a control system.
Figure 5:
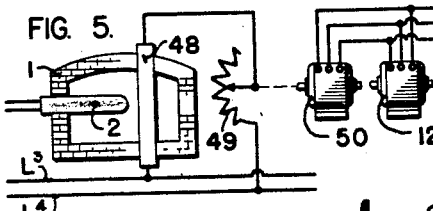

It will be apparent that motor 12 may be employed to operate a control valve or a rheostat for governing the application of an agent to a furnace for producing heat, for example to which the thermocouple 2 is responsive, or another motor desirably operated together with motor 12 may be so employed. For example, as shown in Fig. 5, a furnace 1, to the temperature of which thermocouple 2 is responsive, is heated by a resistor 48 which is connected to electric supply conductors L³ and L⁴ through a rheostat 49, the adjustment of which is effected by a motor 50. The motor 50 may be exactly like motor 12 and is shown connected in parallel therewith. The mechanical connection of the rheostat 49 to the motor 50 is such as to decrease and increase the supply of electric current to resistor 48 as the temperature of furnace 1 rises above or drops below a predetermined level.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. Measuring apparatus including means for impinging a beam of light on a light sensitive element, means for producing deflections of said light beam from a predetermined normal position in accordance with variations from a predetermined value in a condition to be measured, a shield interposed between said impinging means and said light sensitive element, said shield having a narrow rectangular projection at one end thereof across a portion of its width, means responsive to the conductivity of said light sensitive element adapted to control the said second mentioned means for reducing the deflections of said beam from said normal position, and means under control of said responsive means adapted to move said shield relatively to said light sensitive element for temporarily reducing the effect of such deflection.

2. Measuring apparatus including means for converting variations in a physical magnitude into displacement of a light beam in one direction or the other from a predetermined normal position, a light sensitive element responsive to said beam, a shield adapted to intercept a portion of said beam when the said beam is in its normal position, adapted to intercept all of said beam when the said beam is displaced slightly in one direction from said normal position and ineffective to stop passage of said beam when the said beam is displaced slightly in the opposite direction from said normal position, means responsive to the magnitude of current conducted by said light sensitive element adapted to control said first mentioned means for reducing the displacement of said beam from said normal position, and means under control of said responsive means adapted to move said shield relatively to said light sensitive element for temporarily reducing the effect of such displacement.

3. Measuring apparatus including means for impinging a beam of light on a light sensitive element, means for producing deflections of said light beam from a predetermined normal position in accordance with variations from a predetermined value in a condition to be measured, a shield interposed between said impinging means and said light sensitive element, means responsive to the conductivity of said light sensitive element adapted to control the said second mentioned means for reducing the deflections of said beam from said normal position, and means under control of said responsive means to move relatively said shield and said light sensitive element for temporarily reducing the effect of such deflection.

THOMAS R. HARRISON.